Patented Sept. 11, 1951

2,567,839

UNITED STATES PATENT OFFICE 2,567,839

4 METHOXYPHENYL ESTER OF 4-CHLOROBENZENE SULFONIC ACID

Edgar C. Britton and Harold R. Slagh, Midland, Mich., assignors to The Dow Chemical Company, Midland, Mich., a corporation of Delaware No Drawing. Application October 31, 1949,
Serial No. 124,733

1 Claim. (Cl. 260—456)

This invention is concerned with the 4-methoxyphenyl ester of 4-chlorobenzene sulfonic acid having the formula

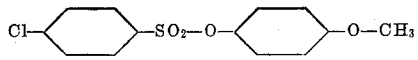

This new ester compound is a white crystalline solid somewhat soluble in many organic solvents and substantially insoluble in water. It is of value as a toxic constituent of parasiticidal compositions.

The new compound may be prepared by reacting 4-chlorobenzene sulfonyl chloride with an alkali metal salt of 4-methoxyphenol. Substantially equimolecular proportions of the reactants have been found to give the ester product in good yield. In practice, the phenolate employed is preferably the sodium salt and may be prepared by reacting substantially equimolecular proportions of sodium hydroxide and the 4-methoxyphenol in water. The reaction between the aqueous phenolate and 4-chlorobenzene sulfonyl chloride may then be accomplished by adding either one portionwise to the other.

The addition is carried out with stirring and at a temperature of from 20° to 100° C. The reaction is somewhat exothermic, and temperature control is maintained by the rate of addition of the reactant, as well as by the addition and subtraction of heat, if required.

In another mode of operation, the reaction may be accomplished by mixing together the 4-chlorobenzene sulfonyl chloride and 4-methoxyphenol and thereafter adding portionwise to this mixture an aqueous solution of the sodium hydroxide. In such operations, the addition is carried out under the reaction conditions described above.

Upon completion of the reaction, the crude mixture is cooled and subsequently filtered to obtain the 4-methoxyphenyl ester of 4-chlorobenzene sulfonic acid. The latter may be further purified as by repeated washing with water and recrystallization from suitable organic solvents.

In a representative preparation, 20 grams (0.5 mole) of sodium hydroxide dissolved in 340 milliliters of water was added portionwise over a period of 30 minutes and with stirring to a mixture of 105.5 grams (0.5 mole) of 4-chlorobenzene sulfonyl chloride and 60 grams (0.5 mole) of 4-methoxyphenol. The addition was carried out at a temperature of from 60° to 70° C., and the resulting mixture maintained at this same temperature for 2 hours to complete the reaction. The crude mixture was then cooled to room temperature and filtered to obtain the 4-methoxyphenyl ester of 4-chlorobenzene sulfonic acid as a white crystalline residue. The latter was washed with water and recrystallized from ethanol to obtain the substantially pure ester melting at 88°.

This ester compound has been found effective as an insecticide and may be employed in dosages required for insect control with negligible injury to the foliage of plants. In this use the compound is preferably employed in combination with an inert carrier, such as water or other liquid diluents. The compound may also be dispersed on a finely divided solid and employed as a dust mixture. Such dust mixture, if desired, may be suspended in water with the aid of a wetting agent and the suspension applied to plants in the form of a spray.

A representative composition found valuable for the control of agricultural pests is the following:

| Composition: | Parts by weight |
|---|---|
| 4-methoxyphenyl ester of 4-chlorobenzene sulfonic acid | 1 |
| Sodium lauryl sulphate (grassille IN 181P) | 0.25 |
| Water | 831.7 |

The foregoing materials were mixed and ball-milled together to produce a spray composition containing 1 pound of toxicant per 100 gallons of solution. When this composition was applied against Mexican bean beetle on cranberry bean plants, a 100 per cent kill of the organism was obtained.

We claim:
The 4-methoxyphenyl ester of 4-chlorobenzene sulfonic acid.

EDGAR C. BRITTON.
HAROLD R. SLAGH.

REFERENCES CITED

The following references are of record in the file of this patent:

UNITED STATES PATENTS

| Number | Name | Date |
|---|---|---|
| 2,148,928 | De Meuron | Feb. 28, 1939 |

OTHER REFERENCES

Burton et al.: J. Chem. Soc. (1945), pages 14–18.

Hoggarth et al.: Brit. J. Pharmacol., vol 3, pages 146–152.